United States Patent
Plummer et al.

(10) Patent No.: US 10,435,142 B2
(45) Date of Patent: Oct. 8, 2019

(54) SYSTEM AND METHOD FOR REDUCING THE TRANSMISSION OF VIBRATION FROM A FIRST VIBRATING BODY TO A SECOND BODY

(75) Inventors: Andrew Plummer, Avon (GB); Peter Court, Somerset (GB); Jean-Paul Henderson, Avon (GB); Nigel Johnston, Avon (GB)

(73) Assignee: AGUSTAWESTLAND LIMITED, Somerset (GB)

( * ) Notice: Subject to any disclaimer, the term of this patent is extended or adjusted under 35 U.S.C. 154(b) by 154 days.

(21) Appl. No.: 14/232,601

(22) PCT Filed: Mar. 26, 2012

(86) PCT No.: PCT/GB2012/050670
§ 371 (c)(1),
(2), (4) Date: Jul. 11, 2014

(87) PCT Pub. No.: WO2013/011264
PCT Pub. Date: Jan. 24, 2013

(65) Prior Publication Data
US 2015/0060595 A1 Mar. 5, 2015

(30) Foreign Application Priority Data
Jul. 15, 2011 (GB) .................. 1112244.7

(51) Int. Cl.
*B64C 27/00* (2006.01)
*B64C 13/50* (2006.01)

(52) U.S. Cl.
CPC .......... *B64C 27/001* (2013.01); *B64C 13/504* (2018.01); *B64C 2027/002* (2013.01); *B64C 2027/004* (2013.01)

(58) Field of Classification Search
CPC ............ B64C 27/001; B64C 2027/002; B64C 2027/004; B64C 13/504; F16F 15/027; F16F 15/023
See application file for complete search history.

(56) References Cited

U.S. PATENT DOCUMENTS 3,477,665 A 11/1969 Legrand
4,735,296 A * 4/1988 Pinson .................. F16F 15/027
188/379

(Continued)

FOREIGN PATENT DOCUMENTS

CN 103917447 A 7/2014
EP 0 271 744 A2 6/1988
(Continued)

OTHER PUBLICATIONS

Xinjie, Ji et al. "Design of the Fuzzy-PID Controller for New Vehicle Active Suspension with Electro-Hydrostatic Actuator". Jun. 30, 2009. 2009 4th IEEE Conference on Industrial Electronics and Applications, pp. 3724-3727 (Year: 2009).*

(Continued)

*Primary Examiner* — Richard R. Green
(74) *Attorney, Agent, or Firm* — Lathrop Gage LLP (57) ABSTRACT

A system for reducing the transmission of vibration from a first vibrating body to a second body, the system having a first part connected to the first vibrating body, a second part connected to the second body and an electro-hydrostatic actuator connected to the first and second parts, the electro-hydrostatic actuator being operable to continuously oscillate the first and second parts 10 relative to each other at a frequency substantially corresponding to the frequency of vibration of the first vibrating body.

22 Claims, 5 Drawing Sheets

(56) References Cited

U.S. PATENT DOCUMENTS

| | | | | |
|---|---|---|---|---|
| 4,819,182 A * | 4/1989 | King | ................. | B64C 27/001 244/17.11 |
| 5,732,905 A | 3/1998 | Krysinski et al. | | |
| 7,017,857 B2 * | 3/2006 | Hill | ................. | G05D 19/02 244/17.13 |
| 7,490,792 B1 * | 2/2009 | Carter, Jr. | ................. | B64C 27/001 244/17.27 |
| 7,837,144 B2 * | 11/2010 | Kothera | ................. | B64C 27/615 244/99.2 |
| 8,760,101 B2 * | 6/2014 | Babando | ................. | B64C 13/50 318/461 |
| 9,211,576 B2 * | 12/2015 | Vignolo | ................. | F16F 15/027 |
| 2003/0077183 A1 * | 4/2003 | Franchet | ................. | F15B 7/006 417/269 |
| 2005/0212523 A1 | 9/2005 | Chang et al. | | |
| 2007/0001052 A1 * | 1/2007 | Strehlow | ................. | B64C 27/001 244/99.1 |
| 2010/0170999 A1 | 7/2010 | Fervel et al. | | |
| 2010/0308179 A1 | 12/2010 | Babando et al. | | |
| 2015/0060595 A1 | 3/2015 | Plummer et al. | | |

FOREIGN PATENT DOCUMENTS

| | | |
|---|---|---|
| EP | 0774411 | 5/1997 |
| EP | 1 724 191 A1 | 11/2006 |
| EP | 2731868 | 5/2014 |
| FR | 2 731 405 A1 | 9/1996 |
| FR | 2 946 401 A1 | 12/2010 |
| GB | 2 160 840 A | 1/1986 |
| GB | 2492965 | 1/2013 |
| HK | 1191621 A | 8/2014 |
| JP | 07081693 | 3/1995 |
| JP | 4042922 B2 | 6/1997 |
| JP | 2005-008129 A | 1/2005 |
| SU | 289569 | 9/1967 |
| WO | WO 00/39480 | 7/2000 |
| WO | WO 2005/013406 | 2/2005 |
| WO | WO 2008/045073 A2 | 4/2008 |
| WO | WO 2010/097596 | 9/2010 |
| WO | WO 2013/011264 | 1/2013 |

OTHER PUBLICATIONS

Navarro, Robert. "Performance of an Ekectro-Hydrostatic Actuator on the F-18 Systems Research Aircraft". Oct. 1997. NASA/TM-97-206224. (Year: 1997).*

Search Report under Section 17 dated Nov. 9, 2011, for corresponding Great Britain Patent Application No. GB1112244.7.

International Preliminary Report on Patentability dated Jan. 21, 2014, for corresponding International Application No. PCT/GB2012/050670.

Written Opinion of the International Searching Authority dated Jan. 15, 2014, for corresponding International Application No. PCT/GB2012/050670.

International Search Report, International Application No. PCT/GB2012/050670, dated Sep. 26, 2012, 4 pages.

Alstrom et al. (2011), "The Effect of Electro-Hydraulic and Electro-Hydrostatic Actuators Dynamics on the Adaptive Control of Chaotic Motions of a Nonlinear Aeroservoelastic (ASE) System", Clarkson University, Potsdam, New York 13699-5725 <<people.clarkson.edu/~ebollt/Papers/AIAASDM2011SubmissionBPE.pdf>>, accessed Apr. 13, 2016.

Le Tron (Sep. 27, 2007) "A380 Flight Controls overview," Airbus S.A.S.

Park et al. (2011) "Robust position control of electro hydrostatic actuator with system uncertainties using sliding mode control and neural networks algorithm," In; 28th International Symposium on Automation and Robotics in Construction (ISARC 2011), Jun. 29-Jul. 2, 2011, Seoul, Korea. pp. 1255-1260.

* cited by examiner

SYSTEM AND METHOD FOR REDUCING THE TRANSMISSION OF VIBRATION FROM A FIRST VIBRATING BODY TO A SECOND BODY

CROSS-REFERENCE TO RELATED APPLICATIONS

This application is a U.S. National Stage Application under 35 U.S.C. § 371 of International Application No. PCT/GB2012/050670, filed Mar. 26, 2012, which claims the benefit of Great Britain Application No. 1112244.7, filed Jul. 15, 2011. All of these applications are hereby incorporated by reference in their entireties.

DESCRIPTION OF INVENTION

The dominant source of vibration in a helicopter in forward flight is that generated by the main sustaining rotor rotating system at the blade passing frequency. Forces and moments are transmitted usually through the transmission via fuselage attachments, to produce vibration in the fuselage.

Active control of structural response vibration suppression systems where hydraulic actuators are used to cancel or at least inhibit vibration between the gearbox and fuselage of a helicopter have been used successfully for many years. However the hydraulic power used by the actuators can be high. For a 15 tonne rotorcraft, a continuous power consumption of over 3 kW is typical. In addition, using hydraulic actuation for smaller rotorcraft has not been seen as practical.

In contrast to active vibration reduction systems, which work to minimise vibrations transmitted to the fuselage throughout a range of frequencies, passive vibration reduction systems have also been proposed, which consume no external power, as they are 'tuned' to work at one specific frequency. Such passive systems lose effectiveness if there is significant variation in rotor speed.

The present invention relates, therefore, to an improved system for reducing the transmission of vibrations from a first body to a second body, particularly, but not exclusively, where the second body is a fuselage, e.g. of a helicopter, and the first body is a rotating system, e.g. a main sustaining rotor of the helicopter having a plurality of rotor blades, supporting or supported by the fuselage. The primary vibration transmission path is the mechanical connection between the first vibrating body and the second body, although the second body, e.g. the fuselage, may also be excited by secondary paths, e.g. such as aerodynamic or acoustic forcing. In some vibrating systems it may also be desirable to reduce or modify the vibration of the first body.

Examples of other vibrating systems to which the present invention can be applied are:
a) ships or vessels, where the first vibrating body is an engine or engines and the second body is a hull of the ship or vessel;
b) aircraft, where the first vibrating body is a propeller(s) and gearbox(s) and engine(s) and the second body is an airframe of the aircraft;
c) power generation systems, where the first vibrating body is an internal combustion engine or rotor such as a turbine or generator, and the second body is the source mounting structure; and
d) other systems where an internal combustion engine or other reciprocating or rotating machine induces vibration in a first body and it is desired to reduce the transmission of those vibrations to a connected second body.

According to a first aspect of the invention we provide a system for reducing the transmission of vibration from a first vibrating body to a second body, the system having a first part connected to the first vibrating body, a second part connected to the second body and an electro-hydrostatic actuator connected to the first and second parts, the electro-hydrostatic actuator being operable to continuously oscillate the first and second parts relative to each other at a frequency substantially corresponding to the frequency of vibration of the first vibrating body.

According to a second aspect of the invention we provide a helicopter comprising a structure including a fuselage supporting or supported by a rotating system, parts of the structure being capable of relative motion at an exciting frequency, there being a plurality of electro-hydrostatic actuators connected between the relatively movable parts of the structure, means operable to continuously oscillate the electro-hydrostatic actuators at a frequency substantially corresponding to the exciting frequency, and a plurality of sensors attached to the rotating system and/or fuselage at selected locations, the sensors being adapted to generate signals representative of dynamic changes at the respective selected locations during rotation, processing means adapted to process the signals from the sensors and to provide output signals for controlling the phase and magnitude of applied forces generated by the electro-hydrostatic actuators and for varying the phase and magnitude characteristics of the applied forces so as to compensate for changes in the dynamic characteristic of the rotating system whereby the overall level of vibration in the fuselage is reduced.

According to a third aspect of the invention we provide a method of reducing vibration in a helicopter structure which includes a fuselage which is supporting or supported by a rotating system parts of the structure being capable of relative motion at an exciting frequency, the method comprising the steps of connecting a plurality of electro-hydrostatic actuators between the relatively movable parts of the structure, oscillating the electro-hydrostatic actuators at a frequency substantially corresponding to the exciting frequency, generating signals representative of dynamic changes at a plurality of locations on the rotating system during rotation and feeding the signals to processing means which are adapted to provide output signals for controlling the phase and magnitude of applied forces generated by the electro-hydrostatic actuators and for varying the phase and magnitude characteristics of the forces so as to compensate for changes in the dynamic characteristic of the rotating system, whereby the overall level of vibration in the fuselage is reduced.

According to a fourth aspect of the invention we provide a method of reducing vibration in a second body, the method comprising the steps of connecting a plurality of electro-hydrostatic actuators between the second body and a first vibrating body, oscillating the electro-hydrostatic actuators at a frequency substantially corresponding to the frequency of vibration of the first body, generating signals representative of dynamic changes at a plurality of locations on the first body and feeding the signals to processing means which is adapted to provide output signals for controlling the phase and magnitude of applied forces generated by the electro-hydrostatic actuators and for varying the phase and magnitude characteristics of the forces so as to compensate for changes in the dynamic characteristic of the first body, whereby the overall level of vibration in the second body is reduced.

According to a fifth aspect of the invention we provide an apparatus for reducing vibration of a structure of a helicopter which comprises a fuselage supporting or supported by a rotating system, and in which parts of the structure are capable of relative motion at an exciting frequency, the apparatus comprising a plurality of electro-hydrostatic actuators adapted to be connected between the relatively movable parts of the structure, means, in use, continuously to oscillate the electro-hydrostatic actuators at a frequency substantially corresponding to the exciting frequency, and a plurality of sensors adapted to be attached to the rotating system and/or fuselage at selected locations on the rotating system, the sensors in use, being adapted to generate signals representative of dynamic changes at the respective selected locations during rotations, the apparatus further comprising processing means adapted to process the signals from the sensors and to provide output signals for controlling the phase and magnitude of applied forces generated by the electro-hydrostatic actuators and for varying the phase and magnitude characteristics of the forces so as to compensate for changes in the dynamic characteristic of the rotating system.

The invention will now be described with reference to the accompanying drawings in which.

Figure 1:
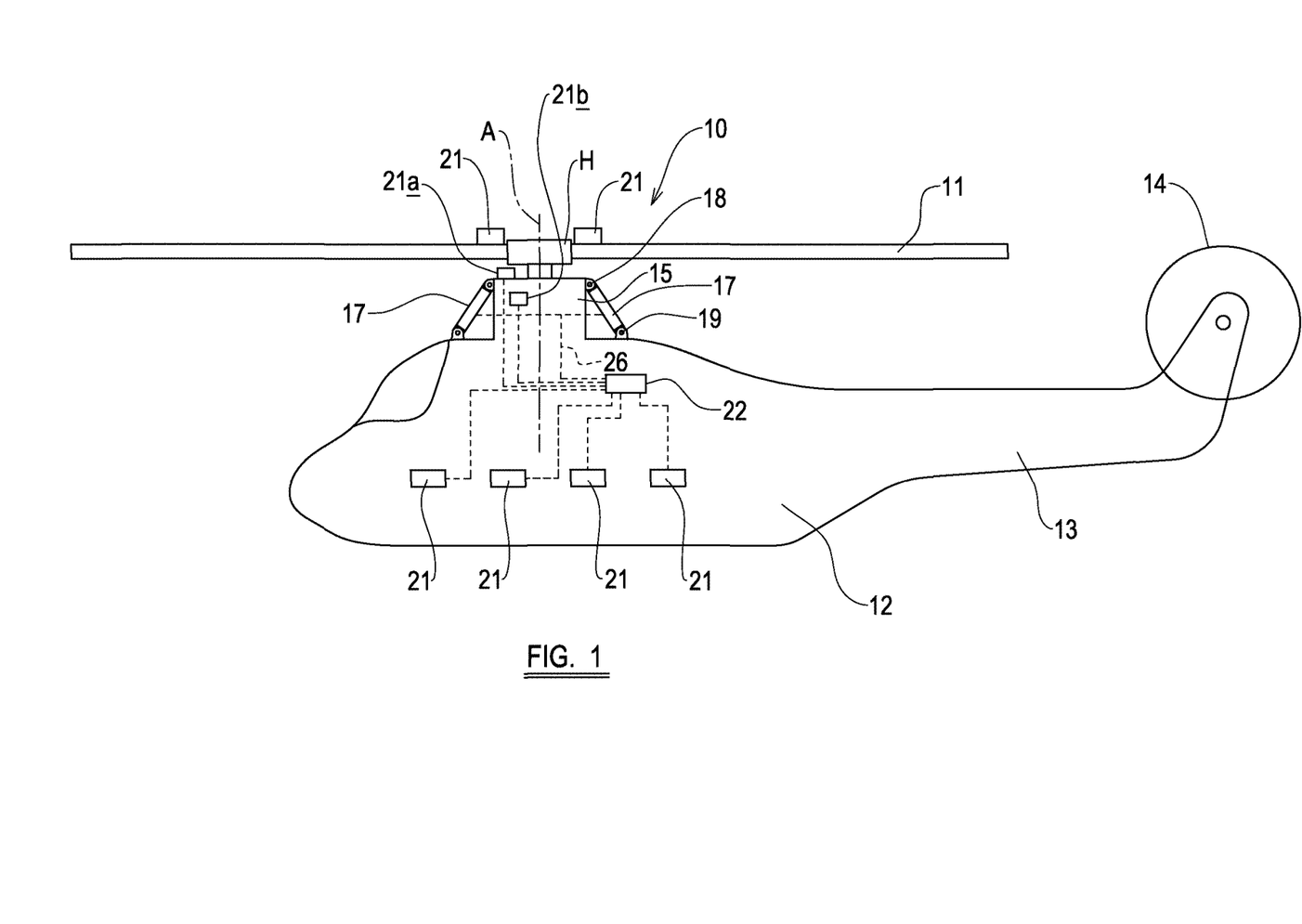
FIG. 1 is an illustrative side elevation of a helicopter fitted with a system according to the invention.

Referring first to FIG. 1 a helicopter structure is generally indicated at 10 including a rotating system comprising a main sustaining rotor 11, a helicopter fuselage 12 having rearwardly extending tail part 13 carrying an anti torque rotor 14. The fuselage 12 carries an engine and gearbox 15 which transmits drive to the main sustaining rotor 11, to drive the rotor 11 about an axis A. The gearbox 15 is attached to the fuselage 12 by means of a plurality of resilient strut assemblies 17, each of which includes an electro-hydrostatic actuator 20 according to the present invention. In the present embodiment there are four resilient strut assemblies 17, one positioned generally at each corner of the gearbox 15; two at the front and two at the rear.

The electro-hydrostatic actuators (described in more detail below) receive operating signals 26 from a processing means 22 located in the fuselage 12. The processing means 22 receives input signals from sensors 21 mounted on the rotor blades of the rotor 11, and/or otherwise on the rotor 11, and/or on the fuselage 12, and/or on the gearbox 15, and/or on one or more of the struts 17, e.g. at one or both of their ends, to vary the phase and magnitude of exciting forces, provided by the actuators 20. In this arrangement the resilient strut assemblies 17 are arranged at about 45° to the vertical, with the helicopter in level flight, although their angle can be altered as desired.

Thus the fuselage 12 and gearbox 15 comprise parts of the helicopter structure which are capable of relative motion at a frequency corresponding substantially with a vibration exciting frequency. Each actuator 20 is adapted during operation, to apply a force to the fuselage 12 that is reacted by an equal and opposite force on the gearbox 15.

The sensors 21 comprise, in this example, accelerometers which are adapted to generate signals representative of dynamic changes at the respective selected locations as the rotor 11 rotates.

In this embodiment, where the sensors are accelerometers, the accelerometers 21 are operatively connected to a processing means comprising a computer 22 which is carried in the fuselage 12, the computer 22 being adapted to provide output signals for controlling the phase and magnitude of the applied forces generated by the actuators 20 and for varying the phase and magnitude characteristics of the forces. In operation, vibratory forces are produced by the main sustaining rotor 11 due, for example, to asymmetric air flow in forward flight. Such vibratory forces arising as the rotor 11 rotates are, in the absence of any compensating systems, transmitted from the gearbox 15 to the fuselage 12. These forces and related moments are predominantly at the blade passing frequency and harmonics thereof, the blade passing frequency being a product of the rotational speed of the rotor 11 and the number of rotor blades.

The helicopter is also provided with one or more rotor position sensors 21a that provide a signal to the processing means 22 related to the angular position of the rotor 11. This may be used for synchronisation of the processing means 22 with the vibration source, to provide a reference signal that provides frequency and or phase information. If the synchronisation signal is not provided then the frequency phase information may be identified from the accelerometers 21.

Alternatively, control strategies based upon vibration feedback with or without the addition of a specific frequency synchronisation signal from the vibration source may be employed.

In addition, the helicopter may be provided with an optional transmission position sensor 21b that provides a signal to the processing means 22 related to the angular position of a rotating component within the transmission. This may be used for synchronisation of the processing means 22 with the vibration source to provide a reference signal that provides frequency and or phase information. If the synchronisation signal is not provided then the frequency phase information may be identified from the accelerometers 21.

Typically, a blade passing frequency for a helicopter would be in the range of 10 Hz to 30 Hz, for example 17 Hz. During slowed rotor flight mode, the frequency may be even lower.

In addition, dynamic changes occurring in the rotor 11 at the locations of the accelerometers 21 cause adjustment of the phase and magnitude of the output signals from the computer 22.

The computer 22 is adapted to analyse vibration signals received from the accelerometers 21, for example, to ensure that the phase and magnitude response characteristics of the set of output signals 26 to the actuators 20, and therefore the actuator output forces, are continuously varied to cater for changing dynamic characteristics in the rotor 11 or fuselage 12.

Thus the method and apparatus of the invention imposes changes in the phase and magnitude of the exciting frequency oscillations of the electro-hydrostatic actuators 20 simultaneously to cancel or at least substantially reduce the level of vibration transmitted from the gearbox to the fuselage 12 thereby providing a significant improvement in the overall vibration level of the helicopter fuselage 12.

In more detail, referring to FIGS. 2 to 5, each electro-hydrostatic actuator 20 includes a piston 31 positioned in a cylinder 32, and an electric motor 33 drivingly connected (i.e. rotationally coupled) to a pump 35, the pump 35 being operable to displace hydraulic fluid so as to effect movement of the piston 31 in the cylinder 32. The piston 31 is connected to an output shaft 38. The embodiment of actuator as shown in the drawings was fabricated for testing purposes, and thus its configuration would likely be altered for it to fit within the strut 17. However, the component parts of the actuator 20 would functionally be the same.

In the present example the electric motor 33 is a D.C. brushless motor (other types of motor could be used) which is supported in a housing 34. The housing is connected to a pump 35 with there being a fluid connection between the pump 35 and the electric motor housing 34. This means that the electric motor 33 in this embodiment is bathed in hydraulic fluid, and thus 'runs wet'. It should be appreciated, however, that the motor could, alternatively, be run "dry".

The motor 33 is configured to drive the pump 35, via appropriate gearing, either clockwise or anti-clockwise to cause hydraulic fluid in the system to move in one of two directions. The piston 31 divides the cylinder 32 into first 36 and second 37 chambers. The first chamber 36 has an inlet 36a which is connected to a first outlet of the pump 35 by a first fluid conduit 39. The second chamber 37 has an inlet 37a which is connected to a second outlet of the pump 35 by a second fluid conduit 40. The pump 35 and piston/cylinder 31, 32 are configured such that displacement of hydraulic fluid by the pump 35 (when rotating clockwise, for example) into the first chamber 36 effects movement of the piston 31 in a first direction (in this example away from the motor 33) whilst displacement of hydraulic fluid by the pump 35 (when rotating anti-clockwise, for example) into the second chamber 37 effects movement of the piston 31 in an opposite direction. The motor 33 is capable of rapidly changing its direction of rotation, so as to match the frequency of vibration of the vibrating body, which in this example is the gearbox 15.

Figure 2:
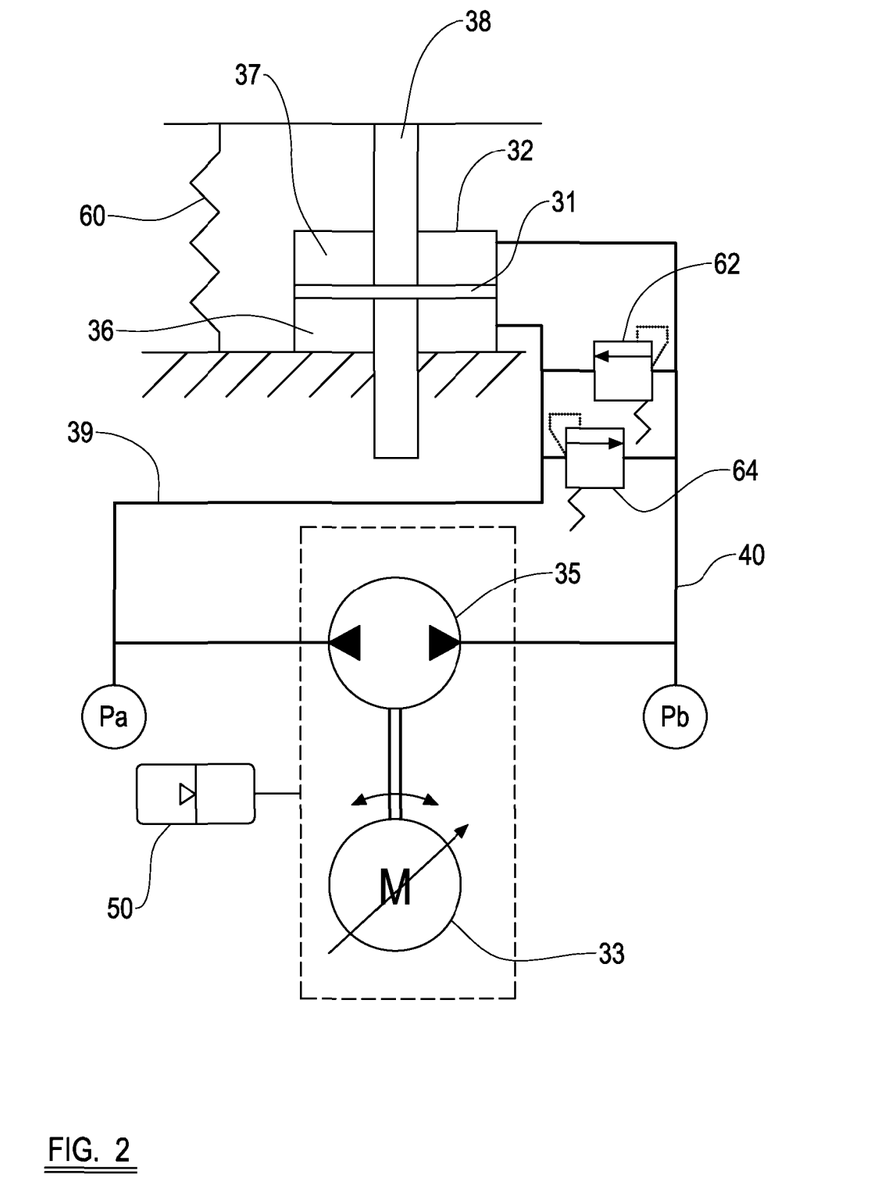
FIG. 2 is a hydraulic circuit diagram of the apparatus of the present invention.
Figure 3:
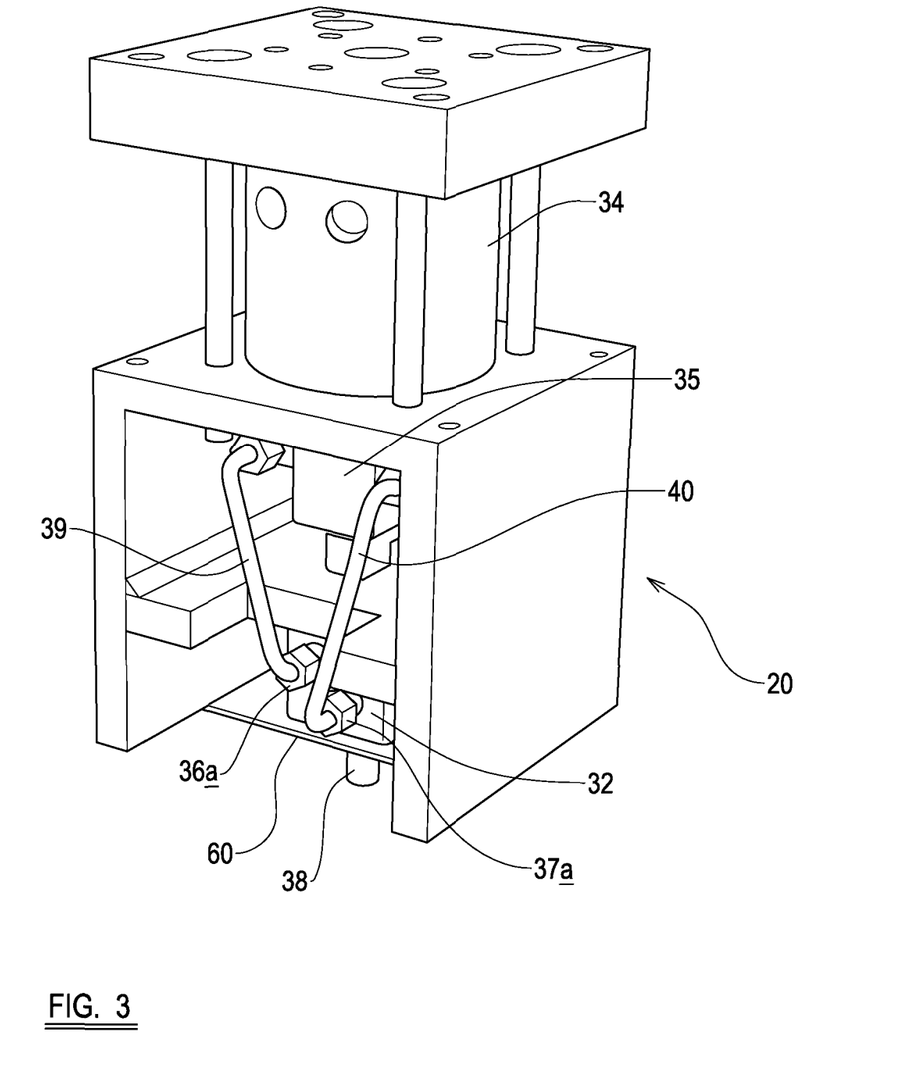
FIG. 3 is a perspective view, from above and one side, of an apparatus embodying the present invention.
Figure 4:
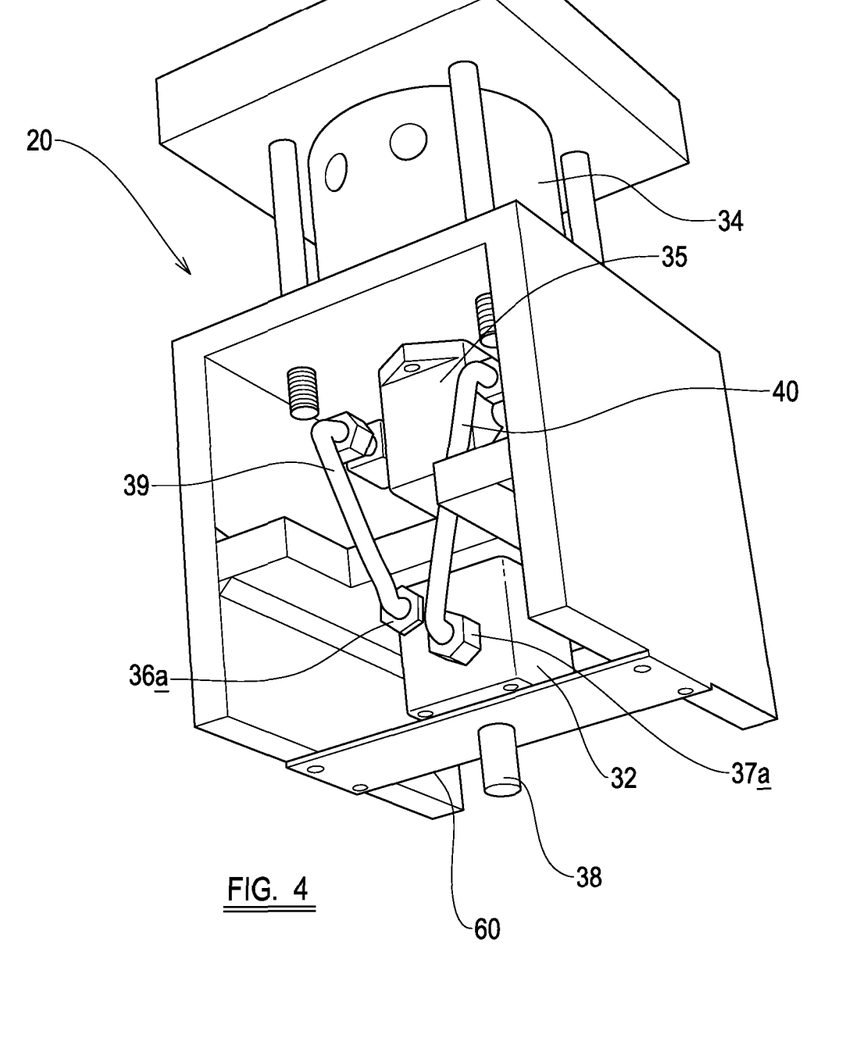
FIG. 4 is a perspective view, from below and one side, of an apparatus embodying the present invention.
Figure 5:
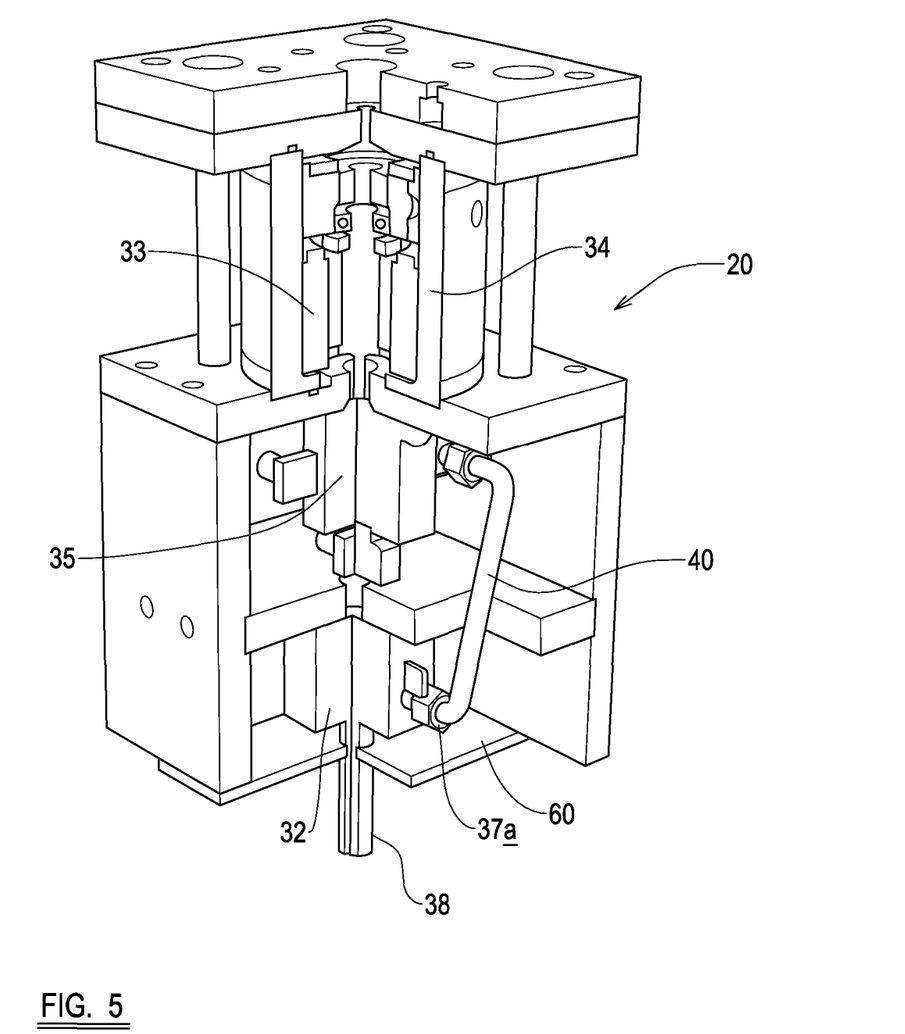
FIG. 5 is a perspective, part cross-sectional, view of an apparatus embodying the present invention.

Pressure sensors, e.g. transducers, Pa and Pb are provided to sense fluid pressure in the chambers 36, 37, and to provide feedback to the processing means 22, and/or to alert a pilot of increased pressure in the system.

The actuator 20 also includes an accumulator 50 for pressurising the hydraulic fluid in the system. The accumulator 50 is fluidly connected to the housing 34 supporting the motor 33. In an alternative embodiment (not shown) the accumulator could be replaced with a chamber with compliant walls, in order to pressurise the hydraulic fluid in the system.

In the present example, it can be seen that the electric motor 33 and pump 35 are positioned in-line (or axially aligned) with the piston 31 and cylinder 32. It should be appreciated, of course, however, that the electric motor 33 and pump 35 may alternatively be positioned in parallel with the piston 31 and cylinder 32. In other words the electric motor 33 and pump 35 may be positioned to one side of the piston 31 and cylinder 32, such that they are not axially aligned.

As shown in FIGS. 2 to 5 the actuator 20 is located in the struts 17 in parallel in a compliant structural member 60, acting as a spring. The configuration of the actuator 20 and spring 60 means that it is possible, but not essential, that the inertia of the pump 35 and motor 33 may be selected so as to tune the resonant frequency of the resulting dynamic system. This resonant (or close resonant) can be used to reduce the amount of power required to be exerted by the motor 33 in operation. In addition, the resonance can be used to provide an entirely passive reduction in the transmitted vibration through the struts 17, and this feature can be used to provide a full-back vibration control system should the electrical command of the motor 33 be unavailable (for example following some internal or external failure affecting the system. In other words, the system can act as a passive or active system.

As shown in FIG. 2 optional pressure relief valves 62, 64 are provided linking the fluid path between both chambers 36, 37 of the cylinder 32 in the event of over-pressure (i.e. if a large external force is applied quicker than the control system can react to). The valve 62 permits fluid (when exceeding a predetermined pressure) to pass from the chamber 37 to the chamber 36, and the valve 64 permits fluid (when exceeding a predetermined pressure) to pass from the chamber 36 to the chamber 37.

The actuator 20 is designed to act both as an active vibration reduction device and as a passive vibration reduction device, depending on the frequency of vibration of the body, e.g. the gearbox, to which it is connected. The actuator 20 has been designed ('tuned') such that at a selected frequency, e.g. 17 Hz, minimal power is required to be provided to the motor 33, because the piston, motor and pump (with its gearing) act as a resonant mass at vibratory loads at the new frequency. As the frequency being transmitted to the strut 17 moves from the selected passive frequency, power will need to be provided to the motor 33 in order to cancel out that frequency, so as to prevent or at least reduce vibrations being transmitted to the fuselage. In other words, the resonant frequency of the hydraulic fluid, pump 35 and electric motor 33 rotor inertia matches the fundamental vibration frequency. The hydraulic cylinder 32, fluid and pump 35 act as a single stage gear ratio, and the motor 33 inertia is the main resonating mass.

The electrical power used by the motor 33 compensates for friction in the actuator and other losses, as well as shifting the operating point away from the resonant frequency. This leads to a decrease in the power required compared to a purely active vibration reduction system. A purely electrically powered active system would likely require forced liquid cooling and additional pumps and radiators to draw sufficient heat away from the motor, and hence the electro-hydrostatic actuator of the present invention is highly advantageous.

The present invention is advantageous over known vibration reducing systems, because it is useable in rotorcraft of all sizes—it is scalable depending on the forces and frequencies experienced by the rotorcraft. It also provides reduced maintenance and reduced fire risk compared with existing hydraulic actuator systems, as there is no requirement for hydraulic lines to the actuator. Due to the 'closed' nature of the actuator 20, it can easily be removed for maintenance or replacement.

Various modifications may be made without departing from the scope of the invention. For example, the number of actuators 20 provided between the gearbox 15 and fuselage 12 can be varied. It will be appreciated that the invention may be utilised to reduce vibration levels in the fuselage 12, by connecting actuators such as 20 between any parts of the helicopter structure which are capable of relative motion at an exciting frequency.

In each case, the sensors preferably comprise accelerometers 21, but one or more of all of the sensors could alternatively measure one or more of forces, strains, accelerations and/or velocities.

If desired, the invention may alternatively or additionally be applied to a rotating system comprising the anti-torque rotor 14 of the helicopter 10, in which case sensing would be attached to that rotating system 14.

Whilst the present invention has been described above with reference to its use in a helicopter, is should be appreciated that the electro-hydrostatic actuators 20 of the present invention, and their method of operation, could be applied to other vibrating systems, such as:

a) ships or vessels, where the first vibrating body is an engine or engines and the second body is a hull of the ship or vessel;

b) aircraft, where the first vibrating body is a propeller(s) and gearbox(s) and engine(s) and the second body is an airframe of the aircraft;

c) power generation systems, where the first vibrating body is an internal combustion engine or rotor such as a turbine or generator, and the second body is the source mounting structure; and d) other systems where an internal combustion engine or other reciprocating or rotating machine induces vibration in a first body and it is desired to reduce the transmission of those vibrations to a connected second body.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A helicopter comprising:
   a structure including:
      a fuselage supporting or supported by a rotating system, the rotating system including a main sustaining rotor having a plurality of rotor blades;
      a tail part that extends rearwardly from the fuselage;
      an anti-torque rotor carried on the rearwardly extending tail part;
      an engine; and
      a gearbox which transmit drive to the main sustaining rotor to drive the rotor about an axis; wherein the gearbox is attached to the fuselage by a plurality of resilient strut assemblies;
   wherein the gearbox and fuselage are capable of relative motion at an exciting frequency which substantially corresponds to the rotor blade passing frequency;
   wherein each of the resilient strut assemblies includes an hydraulically isolated electro-hydrostatic actuator adapted, during operation, to apply a force to the fuselage that is reacted by an equal and opposite force on the gearbox and operable to continuously oscillate the electro-hydrostatic actuators at a frequency substantially corresponding to the exciting frequency;
   a plurality of sensors attached to the rotating system and/or fuselage at selected locations, the sensors being adapted to generate signals representative of dynamic changes at the respective selected locations during rotation; and
   a processing device adapted to process the signals from the sensors and to provide output signals for controlling the phase and magnitude of applied forces generated by the electro-hydrostatic actuators and for varying the phase and magnitude characteristics of the applied forces so as to compensate for changes in the dynamic characteristic of the rotating system whereby the overall level of vibration in the fuselage is reduced,
   wherein the processing device is adapted to analyse the signals from the sensors to ensure that the phase and magnitude response characteristics of the output signals to the electro-hydrostatic actuators, and therefore the electro-hydrostatic actuator output forces, are continuously varied to cater for changing dynamic characteristics in the rotor or fuselage.

2. The helicopter according to claim 1 wherein the rotating system is the main sustaining rotor.

3. The helicopter according to claim 1 wherein one part of the structure which is capable of motion relative to another part of the structure comprises one of or an assembly of more than one of an engine, a transmission, and a supporting structure of the rotating system.

4. The helicopter according to claim 1 wherein the sensors measure one or more of forces, strains, accelerations and/or velocities.

5. The helicopter according to claim 1 wherein the electro-hydrostatic actuators each include a piston positioned in a cylinder, and
   an electric motor drivingly connected to a pump, the pump being operable to displace hydraulic fluid so as to effect movement of the piston in the cylinder.

6. The helicopter according to claim 5 wherein the piston divides the cylinder into a first chamber and a second chamber, such that the displacement of hydraulic fluid by the pump into the first chamber effects movement of the piston in a first direction and such that displacement of the hydraulic fluid by the pump into the second chamber effects movement of the piston in a second direction.

7. The helicopter according to claim 6 wherein the electro-hydrostatic actuators have a fluid conduit connecting the first chamber and the second chamber to each other, with the pump being positioned in the fluid conduit for displacing hydraulic fluid either towards the first chamber and away from the second chamber or towards the second chamber and away from the first chamber.

8. The helicopter according to claim 5 wherein the electro-hydrostatic actuators have an accumulator or a chamber with compliant walls for pressurising the hydraulic fluid in the actuator.

9. The helicopter according to claim 8 wherein the accumulator is fluidly connected to a chamber containing the motor.

10. The helicopter according to claim 5 wherein each electro-hydrostatic actuator electric motor and pump are positioned in-line with the piston and the cylinder.

11. The helicopter according to claim 5 wherein each electro-hydrostatic actuator electric motor and pump are positioned in parallel with the piston and the cylinder.

12. The helicopter according to claim 1, the exciting frequency being in the range of 17 Hertz to 30 Hertz.

13. The helicopter according to claim 1, wherein the sensors measure strains.

14. The helicopter according to claim 1, wherein the sensors measure velocities.

15. A method of reducing vibration in a helicopter structure which includes a fuselage which is supporting or supported by a rotating system parts of the structure being capable of relative motion at an exciting frequency, the method comprising the steps of:

connecting a plurality of electro-hydrostatic actuators between the relatively movable parts of the structure;

oscillating the electro-hydrostatic actuators at a frequency substantially corresponding to the exciting frequency;

generating signals representative of dynamic changes at a plurality of locations on the rotating system during rotation; and feeding the signals to processing means which are adapted to provide output signals for controlling the phase and magnitude of applied forces generated by the electro-hydrostatic actuators and for varying the phase and magnitude characteristics of the forces so as to compensate for changes in the dynamic characteristic of the rotating system, whereby the overall level of vibration in the fuselage is reduced.

16. The method according to claim 15 wherein the electro-hydrostatic actuators each include a piston positioned in a cylinder, and an electric motor drivingly connected to a pump, the pump being operable to displace hydraulic fluid so as to effect movement of the piston in the cylinder.

17. The method according to claim 15, in the step of oscillating, the frequency being in the range of 17 Hertz to 30 Hertz.

18. An apparatus for reducing vibration of a structure of a helicopter which comprises a fuselage supporting or supported by a rotating system, and in which parts of the structure are capable of relative motion at an exciting frequency, the apparatus comprising:

a plurality of electro-hydrostatic actuators adapted to (i) be connected between the relatively movable parts of the structure and (ii) oscillate continuously, in use, at a frequency substantially corresponding to the exciting frequency;

a plurality of sensors adapted to be attached to the rotating system and/or fuselage at selected locations on the rotating system, the sensors in use, being adapted to generate signals representative of dynamic changes at the respective selected locations during rotations; and a processing device adapted to process the signals from the sensors and to provide output signals for controlling the phase and magnitude of applied forces generated by the electro-hydrostatic actuators and for varying the phase and magnitude characteristics of the forces so as to compensate for changes in the dynamic characteristic of the rotating system.

19. The apparatus according to claim 18 wherein the electro-hydrostatic actuators each include a piston positioned in a cylinder, and an electric motor drivingly connected to a pump, the pump being operable to displace hydraulic fluid so as to effect movement of the piston in the cylinder.

20. The apparatus according to claim 18, the frequency substantially corresponding to the exciting frequency being in the range of 17 Hertz to 30 Hertz.

21. A helicopter comprising:

a structure including:

a fuselage supporting or supported by a rotating system, the rotating system including a main sustaining rotor having a plurality of rotor blades;

a tail part that extends rearwardly from the fuselage;

an anti-torque rotor carried on the rearwardly extending tail part;

an engine; and a gearbox which transmits drive to the main sustaining rotor to drive the rotor about an axis;

wherein the gearbox is attached to the fuselage by a plurality of resilient strut assemblies;

wherein the gearbox and fuselage are capable of relative motion at an exciting frequency which substantially corresponds to the rotor blade passing frequency; and wherein each of the resilient strut assemblies includes an hydraulically isolated electro-hydrostatic actuator adapted, during operation, to apply a force to the fuselage that is reacted by an equal and opposite force on the gearbox and operable to continuously oscillate the electro-hydrostatic actuators at a frequency substantially corresponding to the exciting frequency, wherein each electro-hydrostatic actuator includes a motor drivingly connected to a pump;

wherein for each electro-hydrostatic actuator the inertia of the motor and the pump is selected so as to tune the resonant frequency thereof such that at a selected frequency the electro-hydrostatic actuator acts to reduce the vibration in the fuselage, a plurality of sensors attached to the rotating system and/or fuselage at selected locations, the sensors being adapted to generate signals representative of dynamic changes at the respective selected locations during rotation; and a processing device adapted to process the signals from the sensors and to provide output signals for controlling the phase and magnitude of applied forces generated by the electro-hydrostatic actuators and for varying the phase and magnitude characteristics of the applied forces so as to compensate for changes in the dynamic characteristic of the rotating system whereby the overall level of vibration in the fuselage is reduced;

wherein the processing device is adapted to analyse the signals from the sensors to ensure that the phase and magnitude response characteristics of the output signals to the electro-hydrostatic actuators, and therefore the electro-hydrostatic actuator output forces, are continuously varied to cater for changing dynamic characteristics in the rotor or fuselage.

22. The helicopter according to claim 21, the exciting frequency being in the range of 17 Hertz to 30 Hertz.

* * * * *